United States Patent
Twigg et al.

(10) Patent No.: US 9,914,991 B2
(45) Date of Patent: Mar. 13, 2018

(54) FIBRE PRE-FORM MANUFACTURING METHOD

(71) Applicant: ROLLS-ROYCE PLC, London (GB)

(72) Inventors: Edwin Stephen Twigg, Derby (GB); Christopher John Turton, Derby (GB)

(73) Assignee: ROLLS-ROYCE plc, London (GB)

( * ) Notice: Subject to any disclaimer, the term of this patent is extended or adjusted under 35 U.S.C. 154(b) by 394 days.

(21) Appl. No.: 14/683,601

(22) Filed: Apr. 10, 2015

(65) Prior Publication Data

US 2015/0321873 A1 Nov. 12, 2015

(30) Foreign Application Priority Data

May 6, 2014 (GB) .................................. 1407954.5

(51) Int. Cl.
| | | |
|---|---|---|
| B29C 53/56 | (2006.01) | |
| C22C 47/06 | (2006.01) | |
| B65H 54/10 | (2006.01) | |
| F01D 5/28 | (2006.01) | |
| F01D 5/24 | (2006.01) | |
| F01D 5/34 | (2006.01) | |

(Continued)

(52) U.S. Cl.
CPC ............ *C22C 47/064* (2013.01); *B23P 15/04* (2013.01); *B65H 54/10* (2013.01); *C22C 49/04* (2013.01); *C22C 49/06* (2013.01); *C22C 49/11* (2013.01); *F01D 5/24* (2013.01); *F01D 5/282* (2013.01); *F01D 5/34* (2013.01); *F04D 29/023* (2013.01); *F04D 29/542* (2013.01); *B22F 2999/00* (2013.01); *C22C 47/04* (2013.01); *C22C 47/14* (2013.01); *F05D 2300/121* (2013.01); *F05D 2300/125* (2013.01); *F05D 2300/133* (2013.01); *F05D 2300/2112* (2013.01); *F05D 2300/2261* (2013.01); *F05D 2300/6032* (2013.01); *F05D 2300/614* (2013.01)

(58) Field of Classification Search
CPC ......... B29C 53/56; B29C 61/06; B21C 47/04; B21F 3/00; B21F 3/08; H01F 41/071; H01F 41/082
See application file for complete search history.

(56) References Cited

U.S. PATENT DOCUMENTS

| | | | | |
|---|---|---|---|---|
| 4,256,268 A | * | 3/1981 | Fahrbach | ................ H01J 9/236 140/92.1 |
| 7,314,195 B2 | * | 1/2008 | Takeda | .................. H01F 41/082 242/445.1 |

OTHER PUBLICATIONS

Oct. 22, 2014 Search Report issued in GB1407954.5.

* cited by examiner

*Primary Examiner* — Emmanuel M Marcelo
(74) *Attorney, Agent, or Firm* — Oliff PLC

(57) ABSTRACT

A method of forming a metal matrix composite (MMC). The method comprises providing a fiber (26) comprising a ceramic material coated with a metal, providing a winding head (12) having a plurality of circumferentially spaced radially extending alternate first and second finger members (18, 20), the finger members each defining a winding surface (22, 24), the winding surface of each first finger member facing a first axial direction, and the winding surface of each second finger member facing a generally opposite axial direction, wherein adjacent winding surfaces (22, 24) of the first and second finger members (18, 20) are spaced in a circumferential direction, and define an axial spacing less than the diameter of the fiber (26), and winding the fiber around the winding head (12) between the winding surfaces (22, 24) of the first and second finger members (18, 20).

13 Claims, 3 Drawing Sheets

(51) Int. Cl.
*B23P 15/04* (2006.01)
*C22C 49/04* (2006.01)
*C22C 49/06* (2006.01)
*C22C 49/11* (2006.01)
*F04D 29/02* (2006.01)
*F04D 29/54* (2006.01)
*C22C 47/04* (2006.01)
*C22C 47/14* (2006.01)

FIBRE PRE-FORM MANUFACTURING METHOD

FIELD OF THE INVENTION

The present invention relates to a method of forming a fibre pre-form, and a fibre pre-form formed by the method.

BACKGROUND TO THE INVENTION

Metal Matrix Composite (MMC) materials comprising a ceramic fibre such as silicon carbide fibre, and a matrix comprising a metal are known. For example, one known MMC material is titanium Metal Matrix Composite (TiMMC), in which the fibre comprises silicon carbide (SiC), and the composite comprises a metal such as titanium alloy (Ti6Al4V). Other MMC systems are known. For example, the ceramic fibre may comprise alumina or sapphire, and the metal may comprise aluminium or aluminium alloy.

One application for TiMMC materials is reinforcement for "blings". Blings are integrally formed bladed rings, comprising a ring and a number of radially extending aerofoils. Blings are used to form compressor stages in gas turbine engines. However, in order to provide the necessary strength, the blings must in some cases be reinforced by reinforcement rings comprising TiMMC.

The silicon carbide fibres are generally formed using a Chemical Vapour Deposition (CVD) process, in which SiC is "grown" on a carbon or tungsten core. A carbon or carbon rich coating may then be applied to the surface of the SiC fibre to prevent chemical reactions between the titanium alloy and SiC during the consolidation process. The SiC fibres are then coated with a titanium alloy in a Physical Vapour Deposition process (PVD—also known as "sputtering"). An alternative, though less commonly used method comprises Electron Beam Physical Vapour Deposition (EBPVD).

The coated fibres are then wrapped around a shim placed between a pair of circular metallic plates. The shim provides a spacing between the plates, such that the spacing is approximately the same distance as the diameter of the coated fibres. Once the required number of layers is wrapped around the shim, the coated fibres are consolidated by, for example, vacuum hot pressing or hot isostatic pressing (HIP), to form a solid article such as a preform or composite disc. However, in order to maintain the spacing between the plates to the required tolerance across the diameter of the plates during the wrapping process, the plates have to be extremely flat and parallel, to within a few microns. This makes the plates expensive, and limits the size of article that can be manufactured using his process, as it is difficult to maintain such a tolerance on large diameter discs. Furthermore, since the coated fibres vary in diameter somewhat (generally by up to ±5 microns), the spacing may in some cases by larger than the diameter of some of the coated fibres, to the extent that some of the coated fibres overlap during the wrapping process. In other cases, the diameter of the fibres may be greater than the spacing, such that the fibres may snag and snap as they are wound between the plates.

The present invention describes a method of forming a fibre composite article, and an apparatus for forming a fibre composite article which seeks to overcome some or all of the above problems.

SUMMARY OF THE INVENTION

According to a first aspect of the invention, there is provided a method of forming a fibre composite article comprising at least one ceramic fibre embedded in a metal matrix, the method comprising:

providing a fibre comprising a ceramic material coated with a metal;

providing a winding head having a plurality of circumferentially spaced radially extending alternate first and second finger members, the finger members each defining a winding surface, the winding surface of each first finger member facing a first axial direction, and the winding surface of each second finger member facing a generally opposite axial direction, wherein adjacent winding surfaces of the first and second finger members are spaced in a circumferential direction, and define an axial spacing less than the diameter of the fibre; and winding the fibre around the winding head between the winding surfaces of the first and second finger members.

Advantageously, by winding the fibre between the radially spaced winding surfaces of the finger members having an axial spacing less than the diameter of the fibre, the fibre is caused to bend between each finger out of a radially extending plane, thereby causing an out of plane force. This force provides a friction between the fibre and the winding surfaces, thereby holding the wire in place. This in turn reduces the likelihood of a fibre being disturbed, and possibly overlapping with a previous or subsequently wound fibre. On the other hand, since the fibre is constrained only on one side at a time, relatively variations in fibre diameter can be accommodated while avoiding the problems outline above.

The first and second finger members may at least partially overlap in an axial direction. In other words, the winding surfaces of the first and second finger members they face axially outwardly in opposing directions.

The method may comprise winding a plurality of fibres onto the winding head simultaneously. Each fibre may be anchored to a finger member. Where the method comprises winding a plurality of fibres onto the winding head simultaneously, the method may comprise anchoring each fibre to a separate finger member.

The metal may comprise any of the group consisting of aluminium, titanium and magnesium. The filament may comprise any one of the group consisting of silicon carbide, alumina and sapphire. In one embodiment, the fibre may comprise a titanium coated silicon carbide filament. The fibre may have a diameter of approximately 240 μm, and may have a diameter tolerance of approximately ±5 μm. The axial spacing between the first and second finger members may be approximately 0.5 times the diameter of the fibre. The circumferential spacing between the respective first and second fingers may be greater than the diameter of the fibre, and may be approximately 5 mm at an inner diameter of the winding head, to 15 mm at an outer diameter of the winding head.

The method may comprise rotating the winding head while spooling the fibre onto the winding surfaces of the finger members. The method may comprise varying the tension on the fibre as further fibre is wound on to the head. For example, a first layer of fibre may be wound on to the head at a relatively high tension, and a final layer of fibre may be wound on the head at a relatively low tension. Intervening layers may be wound on to the head at intermediate tensions.

DETAILED DESCRIPTION

Figure 1:
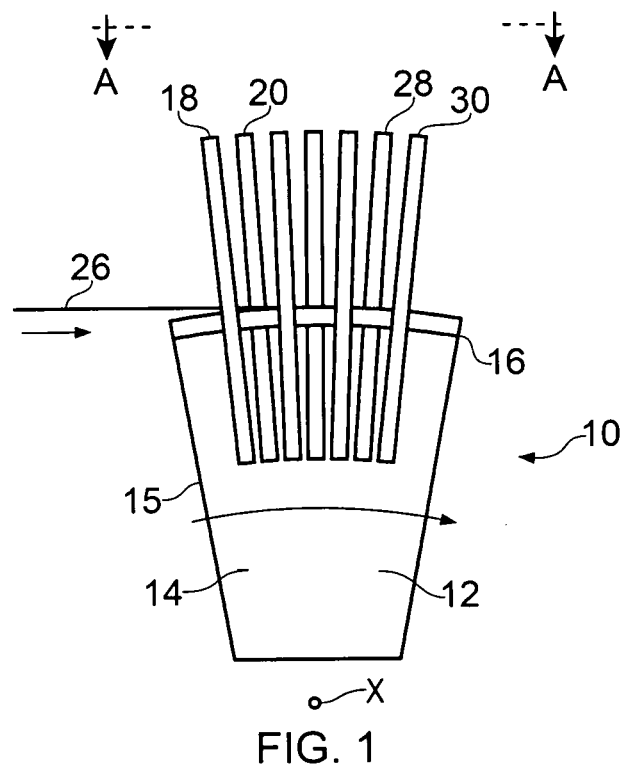
FIG. 1 shows part of a first fibre composite article forming apparatus according to the present invention.

FIG. 1 shows part of a first fibre composite article forming apparatus 10 for use in the method in accordance with the present disclosure. The apparatus 10 is configured to produce a ring shaped fibre pre-form having an internal diameter of approximately 600 mm, and an external diameter of approximately 800 mm, suitable for use as a reinforcement ring for a compressor rotor bling of a gas turbine engine. The apparatus 10 comprises a winding head 12. The winding head 12 comprises first and second coaxial metallic discs 14, 15, an outer circumference of which forms an inner working surface 16 of the head 12. In the described embodiment, the metallic discs 14, 15 have an outer diameter of approximately 600 mm. The head 12 further comprises a plurality of first 18 and second 20 finger members, which extend in a generally radial direction from the working surface 16 of the head 12, and are attached to respective first and second discs 14, 15. The second disc 15 is located behind the first disc 14, as shown in FIG. 1. In the described embodiment, the head 12 comprises fifty six first finger members 18, and fifty six second finger members 20. The finger members 18, 20 have a length of approximately 170 mm, such that the outer diameter of the head 12 from the tip of the finger members 18, 20 on one side of the head 12 to the tips of the finger members 18, 20 on the other side is approximately 840 mm. The head 12 is rotatable about an axis X. Both the discs 14, 15 and the finger members 18, 20 are made of a relatively high strength metal such as extruded aluminium alloy, or titanium alloy. Ideally, the discs 14, 15 and finger members 18, 20 are composed of the same metal alloy that forms the fibre matrix (titanium 6,4 alloy in this case), to ensure chemical and mechanical compatibility, and to avoid contamination of the fibre.

Figure 2:
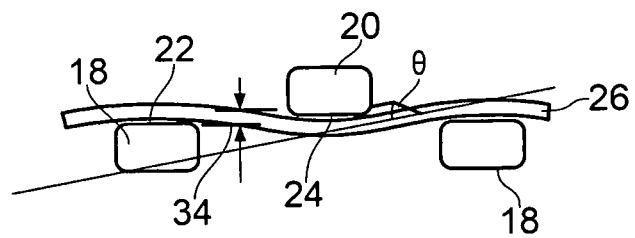
FIG. 2 shows part of the apparatus of FIG. 1 along the line A-A.

FIG. 2 is a view along the line A-A in FIG. 1, showing the finger members 18, 20 in more detail. Each finger member 18, 20 comprises a respective winding surface 22, 24. The winding surfaces 22, 24 face inwardly in opposite axial directions, and have a circumferential length of approximately 1.25 cm. The winding surfaces 22, 24 have a relatively smooth surface finish to allow a titanium coated ceramic silicon carbide fibre 26 to slide along the radial finger members 18, 20 from a radial tip 28, 30, to the working surface 16 and are substantially parallel to each other.

The fibre 26 comprises a filament coated with a titanium matrix by a vacuum deposition process, such that the coated fibre 26 has a diameter of approximately 240 μm. However, the diameter of the fibre may vary somewhat along it length, such that a fibre 26 having a typical diameter of 240 μm may vary in diameter from around 235 μm to around 245 μm, though the described method is capable of accommodating fibres having smaller or larger diameters, as well as fibres having a larger variation in diameter. Once an article is formed, the silicon carbide fibre provides reinforcement, while the titanium provides a matrix material.

Figure 3:
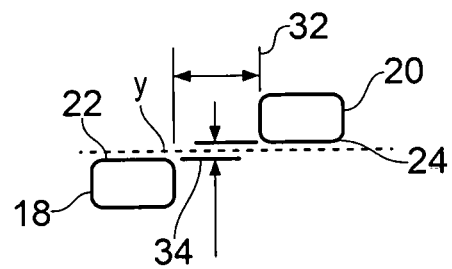
FIG. 3 is a closeup of the apparatus of FIG. 2, showing the dimensions of part of the apparatus.

FIG. 3 shows the dimensions of the first and second finger members 18, 20. The finger members 18, 20 are circumferentially spaced, as shown in FIG. 3 as spacing 32. The circumferential spacing 32 varies from a spacing of approximately 5 mm at the working surface 16, to a spacing of approximately 15 mm at the radial tips 28, 30. A radial plane Y is defined between the first and second finger members 18, 20. The finger members are separated in an axial direction to define a gap 34 of approximately 120 μm in a direction normal to the radial plane A between the winding surfaces 22, 24, which face one another. The gap 34 is approximately 120 μm, i.e. approximately half the diameter of the fibre 26.

The finger members 18, 20 have a width of approximately 12.5 mm (i.e. the circumferential width of the respective winding surfaces 22, 24 is 12.5 mm) and a thickness (i.e. the length of the finger members in the axial direction) of approximately 12.5 mm. Consequently, the mean circumferential finger separation is approximately the same as the finger width.

Figure 4A:
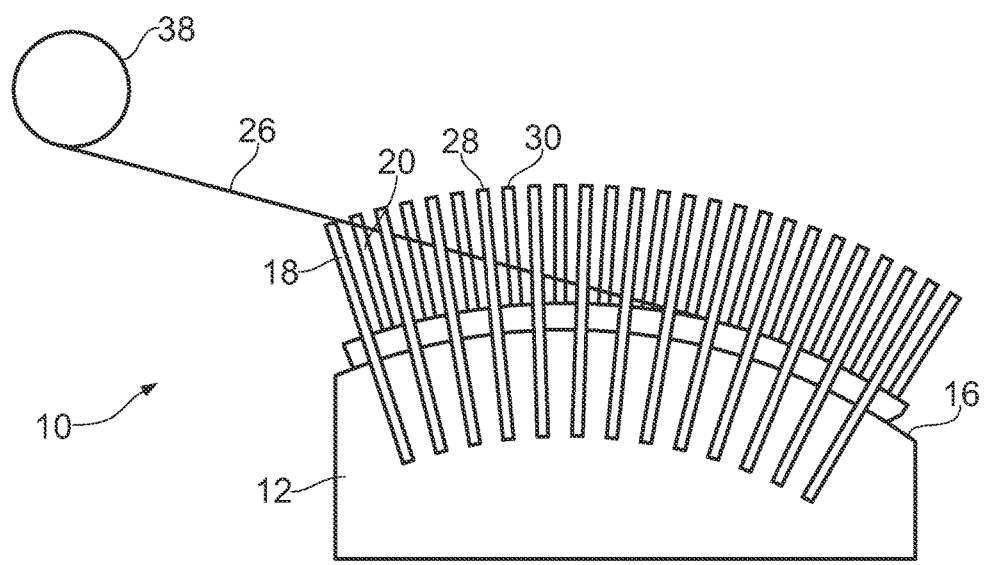
FIG. 4a shows a layer being wound on to the apparatus of FIG. 1.
Figure 4B:
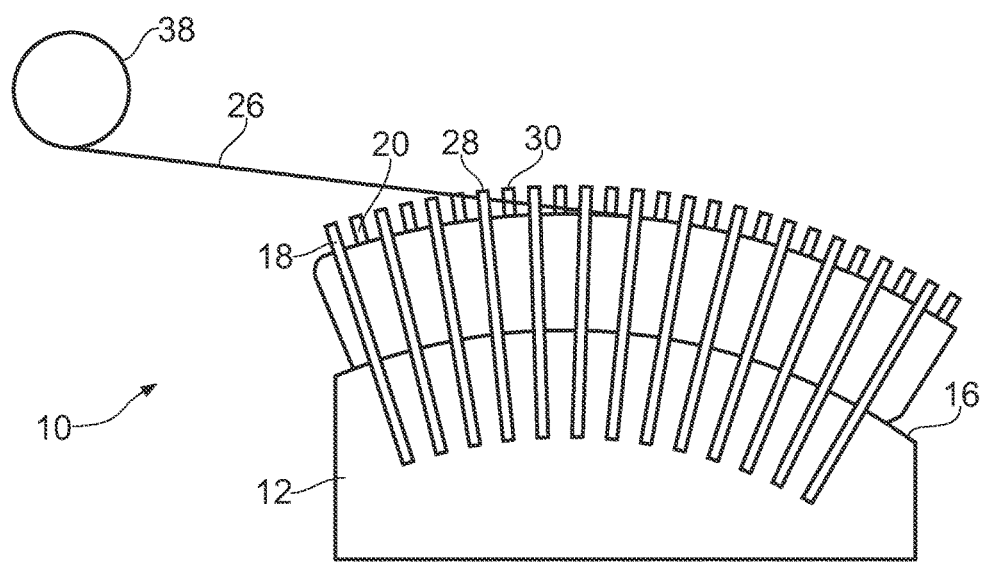
FIG. 4b shows a further layer being wound on to the apparatus of FIG. 1.

With reference to FIGS. 4a and 4b, an article in the form of a metal matrix composite pre-form 36 can be made as follows.

Coated fibre 26 is provided on a spool 38. An end of the fibre 26 is anchored to a radially inner end of a finger member 18, 20 adjacent the working surface 16, or possibly to one of the discs 14, 15. In some cases, a plurality of spools 38 may be provided, in which case a plurality of fibres 26 are anchored to respective finger members 18, 20 at regular intervals (for example, where four fibre spools 38 are provided, the fibres are anchored approximately 90° apart). The spool 38 is provided radially outwardly of the tips 28, 30 of the finger members 18, 20, such that the fibre 26 extends from beyond the tips 28, 30, to the working surface 16 between the finger members 17, 20, and engaging the winding surfaces 22, 24, as shown in FIG. 2. The tips 28, 30 of the finger members may be tapered or rounded to facilitate entry of the fibre 26 between the winding surfaces 22, 24.

Once an end of the fibre 26 is anchored to a finger member 18, 20, with the fibre 26 extending between the winding surfaces 22, 24, the fibre 26 is wound onto the head 12 by rotating the disc 14 about the axis X. As the disc 14 is rotated, fibre 26 is unspooled from the spool 38 onto the working surface 16, between the winding surfaces 22, 24. The fibre 26 slides down between the winding surfaces 22, 24 as the disc 14 is rotated.

Once the fibre 26 meets the working surface 16, or a previous fibre layer, the fibre 26 is urged toward a straightened orientation by the resilience of the fibre 26 and the tension in the fibre 26, thereby forcing the fibre against the winding surfaces 22, 24, thereby producing a normal force. The amount of the normal force will be dependent on the bend angle θ, as shown in FIG. 2 This normal force results in friction between the fibre 26 and the winding surfaces 22, 24, and primarily between the fibre 26 and an edge of the winding surfaces 22, 24. Due to this friction, the fibre 26 is held in place in both the radial and axial directions, thereby substantially preventing movement of the fibre 26 once it is wound onto the head on the working surface 16 or a previous layer. Consequently, the fibres 26 build-up layer by layer, without any of the fibre layers overlapping. Each time the discs 14, 15 are rotated one complete rotation, a further layer of fibre 26 is laid onto the disc 14. As further layers are built up, the diameter of the wound fibre 26 increases until either the tips 28, 30 are reached, or a wound ring is formed having a required diameter. The described method has been found to be suitable for forming a ring having an external diameter of up to (and perhaps greater than) 800 mm.

Since the spacing 32 between the finger members 18, 20 varies from a radially inner end adjacent the working surface 16 to a radially outer end at the tips 28, 30, the force normal to the winding surfaces 22, 24 due to the resilience and tension of the fibre 26 will also vary from the radially inner to the radially outer ends of the fingers 18, 20. The finger members 18, 20 may also be somewhat resilient, and so may be bent or twisted by the normal force. Consequently, an increased tension will generally reduce the gap 34, and increase the friction. This increased friction may prevent the fibre sliding down the radial length of the finger members 18, 20 in operation. This friction reduces as layers are built up and the diameter of the wound fibre increases, as both the radial length of the finger members 18, 20 down which the fibre 26 has to slide, and the number of winding surfaces 22, 24 between which the fibre 26 has to pass both reduce, as can be seen by a comparison of FIGS. 4*a* and 4*b*.

Consequently, the tension in the fibre 26 is reduced from a relatively high tension for the first layer adjacent the working surface 16, to a relatively low tension for the final layer adjacent the tips 28, 30. For example, the tension for the first layer may be approximately 1 Newton, and the tension for the final layer may be approximately 0.6 Newtons. Consequently, the remaining tension in the fibre 26 once wound is substantially constant, thereby resulting in a stable pre-form.

Once the fibre has been fully wound onto the apparatus 10 to provide a ring having the required outer diameter, the a MMC ring can be formed as follows.

A binder such as polymethyl methacrylate (PMMA, also known as Perspex™) dissolved in a solvent is applied in radial strips in the spacing 32 between the first and second fingers 18, 20 to the outer surfaces of the wound fibres 26. The solvent is allowed to evaporate, leaving the PMMA bound to the fibres 26, thereby maintaining the shape of the fibres 26.

The ring comprising the bound fibres 26 and PMMA are then removed from the apparatus 10 by removing one of the plates 14, 15. The ring is then depolymerised under vacuum at high temperature, which removes the PMMA. The depolymerised ring is then placed in a Hot Isostatic Pressing (HIP) vessel, and hot isostatically pressed. During the HIP process, the fibres 26 are consolidated, thereby removing air gaps between the fibres to leave a substantially fully consolidated, solid ring which can be used in the construction of a compressor bling.

Figure 5:
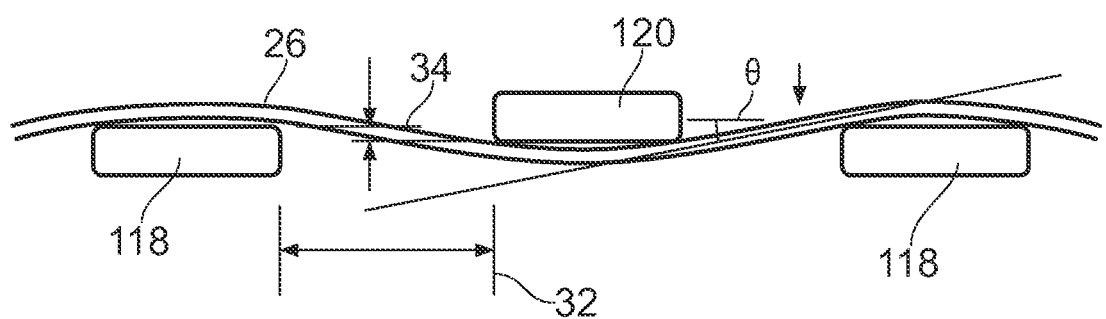
FIG. 5 shows a figure similar to that of FIG. 2, but of a second fibre composite article forming apparatus according to the present invention.

FIG. 5 shows part of a second fibre composite article forming apparatus 110, corresponding to the same view as FIG. 2.

The apparatus 110 is largely similar to the apparatus 10, except that the dimensions of the apparatus are altered.

The apparatus 110 comprises radially extending first and second finger members 118, 120 attached to discs (not shown). The finger members 118, 120 are wider in a circumferential direction, and have a wider circumferential spacing 32, such that the width of the finger members 118, 120 and the circumferential spacing 32 are approximately equal. Such an arrangement may be suitable for forming larger diameter articles.

Since the spacing 32 between the finger members 118, 120 is larger, in order to maintain the tension in the fibre 26, the finger members 118, 120 partially overlap (and so have a negative axial spacing) in a circumferential direction, such that the winding surfaces 22, 24 of the respective finger members 118, 120 extend either side of a radially extending plane Y to define an offset 34 of approximately 120 µm, with each winding surface 22, 24 facing axially outwardly away from the other winding surface. More generally, the offset 34 is approximately 0.5 times the average diameter of the fibre 26. This overlap is necessary to ensure that the bend angle θ is similar to that in provided by apparatus 10, such that finger members 118, 120 grip the fibre sufficiently tightly in spite of the larger gap between the fingers 118, 120.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, while the method and apparatus have been described in terms of forming an article comprising a titanium coated silicon carbide fibre composite material, the invention may be applicable to other types of fibre and matrix materials, for producing fibre composite articles of different types. For example, the filament could comprise a different ceramic material. Similarly, the matrix material could comprise a different metal, such as a different titanium alloy, or an aluminium or magnesium alloy.

The dimensions may also differ. Generally, the spacing 32 and overlap 34 are dependent on the tension in the fibre, the diameter of the fibre, the resiliency of the fibre (i.e. the material of the fibre), the diameter of the winding head, and the maximum diameter of the ring. For example, less stiff fibres may require a smaller axial gap or a greater overlap between the finger members 18, 20, in order to create the necessary friction on the fibre. Similarly, the finger width should be narrow enough to support the fibre, yet not too narrow to act as a knife, and cut the fibre.

The apparatus may be constructed in a different way. For example, the apparatus could comprise a single plate, with first and second finger members attached.

The invention claimed is:

1. A method of forming a fibre composite article comprising at least one ceramic fibre embedded in a metal matrix, the method comprising:
   providing a fibre having a diameter comprising a ceramic material coated with a metal;
   providing a winding head having a plurality of circumferentially spaced radially extending alternate first and second finger members, the finger members each defining a winding surface, the winding surface of each first finger member facing a first axial direction, and the winding surface of each second finger member facing a generally opposite axial direction, wherein adjacent winding surfaces of the first and second finger members are spaced in a circumferential direction, and define an axial spacing less than the diameter of the fibre; and
   winding the fibre around the winding head between the winding surfaces of the first and second finger members.

2. A method according to claim 1, wherein the first and second finger members at least partially overlap in a circumferential direction.

3. A method according to claim 1, wherein the method comprises winding a plurality of fibres onto the winding head simultaneously.

4. A method according to claim 1, wherein each fibre is anchored to a respective finger member.

5. A method according to claim 1, wherein the metal comprises any of the group consisting of aluminium, titanium and magnesium.

6. A method according to claim 1, wherein the ceramic material comprises any of the group consisting of silicon carbide, alumina and sapphire.

7. A method according to claim 1, wherein the fibre comprises a titanium coated silicon carbide filament.

8. A method according to claim 1, wherein the fibre has a diameter of approximately 240 μm.

9. A method according to claim 1, wherein the axial spacing is approximately 0.5 times the diameter of the fibre.

10. A method according to claim 1, wherein the circumferential spacing between the respective first and second fingers is approximately 5 mm at an inner diameter of the winding head, to 15 mm at an outer diameter of the winding head.

11. A method according to claim 1, wherein the method comprises rotating the winding head while spooling the fibre onto the winding surfaces of the finger members.

12. A method according to claim 1, wherein the method comprises varying the tension on the fibre as further fibre is wound on to the head.

13. A method according to claim 12, wherein a first layer of fibre is wound on to the head at a relatively high tension, and a final layer of fibre is wound on the head at a relatively low tension.

* * * * *